Figure 1:
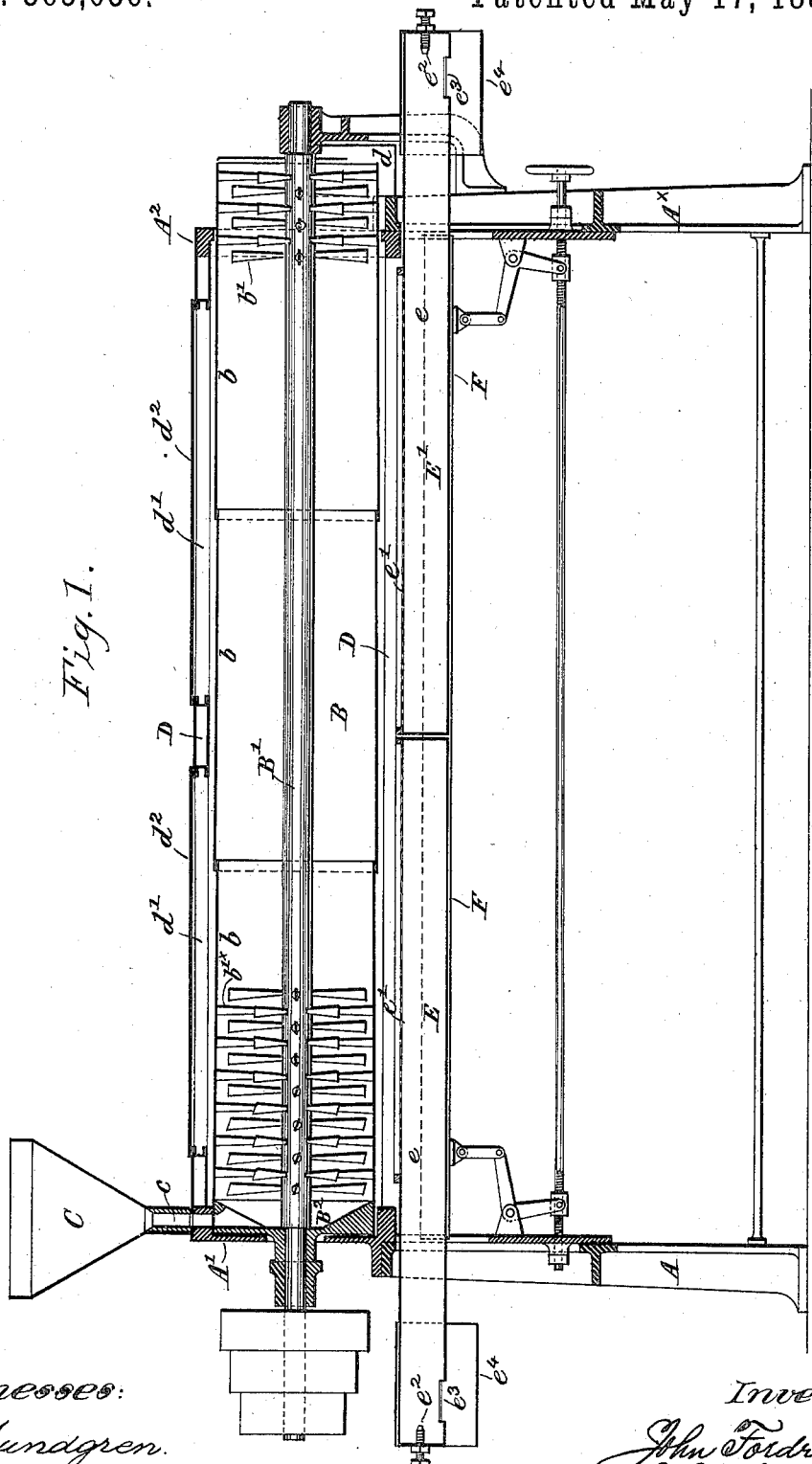

(No Model.)
2 Sheets—Sheet 1.

J. FORDRED.
PROCESS OF PREPARING GRAIN OR CEREALS.

No. 363,056. Patented May 17, 1887.

Witnesses:
C. J. Sundgren
Emil Herter

Inventor:
John Fordred
By his attorneys
Brown & Hall (No Model.) 2 Sheets—Sheet 2.
J. FORDRED.
PROCESS OF PREPARING GRAIN OR CEREALS.
No. 363,056. Patented May 17, 1887.
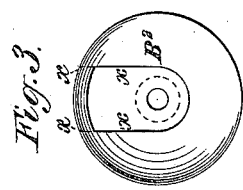
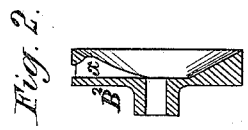 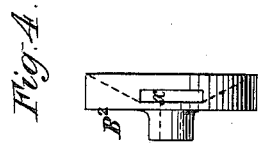
Witnesses:
Inventor:

United States Patent Office.

JOHN FORDRED, OF TOTTENHAM, COUNTY OF MIDDLESEX, ENGLAND.

PROCESS OF PREPARING GRAIN OR CEREALS.

SPECIFICATION forming part of Letters Patent No. 363,056, dated May 17, 1887.

Application filed September 7, 1886. Serial No. 212,955. (No model.) Patented in England November 8, 1881, No. 4,891; in Germany June 13, 1882, No. 20,686; in France July 15, 1882, No. 150,121; in Belgium July 29, 1882, No. 58,620, and in Victoria November 13, 1882, No. 3,345.

*To all whom it may concern:*

Be it known that I, JOHN FORDRED, of Tottenham, in the county of Middlesex, England, technical chemist, have invented an Improved Process of Preparing Grain or Cereals for Use in Brewing, Distilling, and Vinegar-Making, (for which I have obtained British Patent No. 4,891, dated November 8, 1881; German Patent No. 20,686, dated June 13, 1882; French Brevet No. 150,121, dated July 15, 1882; Belgian Brevet No. 58,620, dated July 29, 1882, and patent for Victoria, Australia, No. 3,345, dated November 13, 1882,) of which the following is a specification.

The object of this invention is to provide a cheap and effective substitute for a portion of the malt now used in brewing, distilling, and vinegar-making without injuriously affecting the quality of the manufactured products.

It has long been the practice to combine raw grain with malt in the preparation of a wort for brewing, distilling, and vinegar-making; but the result of such practice has been to injure the flavor of the ultimate product, and thereby to neutralize the gain realized by the use of the raw grain.

To secure the object of this invention I take any suitable grain or cereal and torrefy or partially torrefy it, barley being generally preferred for the purpose.

The essential conditions of my treatment of raw grain are the envelopment of each individual corn in an atmosphere of steam while it is kept in motion; and this double effect is produced preferably by the rotary action of the closed and heated metal cylinder hereinafter described, and constituting a material part of the torrefying apparatus for which I have applied for Letters Patent concurrently with the present application. I thus avoid all liability to the charring of the grain by the heat employed, which would unfit the barley for brewing purposes.

Under my system of treatment, this combined effect of heat and moisture produces important changes in the constituents of the grain operated on, the starch present in it being brought into the soluble condition. This enables the diastase of the malt to convert the starch rapidly into saccharine during the subsequent process of mashing.

The accompanying drawings illustrate the torrefying apparatus for carrying out my invention.

Figure 1 represents a longitudinal vertical section of the apparatus. Fig. 2 represents a vertical section of one of the heads of the rotary cylinder, which constitutes the principal part of the apparatus. Fig. 3 is an inner face view of the said head. Fig. 4 represents a top view of the said head in the position in which it is shown in Figs. 1 and 2.

This apparatus consists of a horizontal rotary cylinder inclosed in a jacketed casing and furnished with a gas-heating apparatus. This cylinder, which, as designed, has a heating-surface eight feet in length and sixteen inches in diameter, is composed of sheets of thin metal $b$, laid around a series of rings of blades, $b'$ $b'^*$, projecting radially from a horizontal axle, B', which blades not only serve to carry the metal sheets forming the periphery of the cylinder, but act as propellers of the grain submitted to the torrefying process. The feeding end of the cylinder is closed by a circular plate or head, $B^2$, which is cast with a central hub which is fitted and firmly secured to the shaft B'. This plate or head is dish-shaped on its inner face, as shown in section in Figs. 1 and 2, and is cored out from its periphery toward its center, as shown at $x$ $x$ in Figs. 2, 3, and 4, to form a passage into the cylinder for the grain to be treated. This end plate fits within a circular flange projecting from a casting, A', which is bolted to the standard A. In the upper part of this casting is a neck, $c$, corresponding in cross-section with the cored-out passage in the end plate, $B^2$, and upon this neck is fitted a hopper, C, for supplying the grain to the cylinder as the cylinder in its rotation brings the supply-passage of the plate $B^2$ into coincidence with the neck $c$.

The delivery end of the cylinder B is open, and it projects through an annular casting, $A^2$, bolted to the standard A* at the right-hand end of the machine, and overlies a delivery-chute, $d$. This open end of the cylinder I cover with a cap or shield set up facing the end of the cylinder and carried by the chute or other convenient fixed portion of the apparatus. This insures the delivery of the torrefied grain into the chute, The cylinder B is inclosed in a jacketed wrought-iron cylindrical casing, D, packed with filamentary asbestos or with silicate cotton, for the purpose of retaining the heat generated by the burners, to be presently described. This casing presents a longitudinal opening at bottom, to allow the flame of the gas-burners E E' to play upon and around the cylinder B.

In the upper part of the casing are formed longitudinal slots, as at $d'$ $d'$, which slots are fitted with damper-valves or other contrivances $d^2$, for the purpose of regulating the draft, and consequently the temperature within the casing.

Underlying the bottom opening in the casing and extending from end to end of the machine is a metal flanged table, F, which is intended to receive the gas-burners E E' and hold them to the required height below the rotary cylinder B, their distance therefrom being made variable to suit the work in hand.

The gas-burner consists of an iron tube, $e$, of, say, five inches in diameter and of about five feet six inches in length, provided with a longitudinal slot, $e'$, through its upper side some three feet nine inches in length and two inches wide. Both ends of this tube are closed, and its outer end, which constitutes a mixing-chamber, is fitted with a gas-jet, $e^2$, set concentrically in the end of the tube and having a bore some three-eighths of an inch in diameter. Immediately below this jet an opening, $e^3$, is made in the tube for the admission of air thereto, and this opening is protected by a shield or wind-guard, $e^4$. Thus the air and gas commingle and fill the mixing-chamber preparatory to entering the slotted portion of the tube. The longitudinal slot $e'$ is covered by a strip of iron-wire gauze for producing a lambent flame.

The machine, it will be seen, is fitted with two burners such as that just described, set end to end on the adjustable flanged table F, each receiving its own supply of the mixed gases, which, issuing through the wire-gauze covering the narrow longitudinal slots, together give, when united, a smokeless flame nearly equal in length to the length of the cylinder B.

The effect on the grain submitted to this apparatus is to render the tough barley friable and to impart to it, more or less, the properties of ordinary malt. After allowing it to cool I pass it through rolls or some form of crushing-machine to reduce it to the condition suitable for introduction into the mash-tun.

In operating upon barley with the torrefying apparatus I give to the cylinder by preference fifty rotations per minute, which is the speed that insures the most efficient distribution of the grain in the cylinder and the delivery of the torrefied grain therefrom. The cylinder I supply with the grain at the rate of from eight to twelve bushels per hour. This insures the exposure of each corn to the action of the heat from one to three minutes, according to the length of the machine, after which it is discharged from the cylinder onto the chute in a properly-torrefied state.

The rate of consumption of the gas per burner for maintaining an efficient heat will range between two and a half and three and a half cubic feet per minute.

The temperature I maintain within the cylinder during the operation ranges from 500° to 600° Fahrenheit, and the grain as it leaves the machine will have a temperature of some 270° to 280° Fahrenheit.

As a guide to the operator when torrefying barley, I may state that if the torrefaction has been properly performed the barley, after passing through the apparatus, will present an abnormal appearance, being much swollen, or burst, and will float like ordinary malt when thrown upon water. This peculiar effect is due to the action of the heat upon the normal moisture (say from ten per cent. to fourteen per cent.) usually present in barley. This moisture is by means of the heat employed converted into steam, which greatly distends the starch-cells and in many cases ruptures them, as well as the grain itself, leaving, however, the interior of the corn of a pure-white color but devoid of sweetness. The material so torrefied or partially torrefied, as above described, may be used (after crushing) with malt in varying proportions, according to the purpose for which the worts are intended to be employed. Thus, for example, when preparing a brewer's wort, I combine my torrefied grain with malt in the proportions of twenty-five parts, by weight, of torrefied grain to seventy-five parts, by weight, of malt. When using the ordinary malt-rolls for crushing the torrefied barley, they should be set up closer than when crushing malted barley.

I would remark that besides barley I propose to torrefy or partially torrefy and use for the like purpose other grain or cereals, such as maize, rice, wheat, dari, millet, oats, and rye.

In distilling and vinegar-making the first process is similar to that of brewing—viz., the preparation of a sweet wort in the mash-tun—and for this purpose raw grain is generally used in combination with malt; but I have found that grain torrefied according to the above-described process may be advantageously substituted for the raw grain hitherto employed. Thus, for distilling purposes I have obtained a good result by using torrefied grain and malt in the following proportions: Torrefied grain, eighty parts by weight; malt, twenty parts by weight. So, also, in preparing a wort for vinegar-making I obtain a good result by combining fifty parts, by weight, of malt with fifty parts, by weight, of the torrefied barley. By thus substituting the cheaper material (torrefied grain) for a large proportion of malt I effect a substantial economy in brewing, distilling, and vinegar-making without deteriorating appreciably the quality of either product.

I am aware that it has been proposed to prepare grain for distilling by subjecting it for from forty-five minutes to two hours and a half to the application of heat ranging between 212° Fahrenheit and that at which it would be scorched or charred. That treatment, however, is not what I claim, and differs essentially from mine. Its effect is to partially convert the starch of the grain into dextrine or British gum or to convert the grain into coloring-matter. By my process, however, the starch constituents of the grain are preserved chemically unchanged and the natural color of the interior of the grain is rendered whiter; but its principal advantage is that, as has been hereinbefore stated, the starchy particles are rendered more easily soluble. Moreover, the action of slow drying is to shrivel and contract the grain, whereas by my process the grain is expanded.

What I claim as my invention is—

1. The process of preparing grain for use by brewers, distillers, and vinegar-makers, consisting in agitating the same in a confined space at a temperature of 600° Fahrenheit, or thereabout, for some two or three minutes for the purpose of producing the conversion into steam of the moisture of the grain, and thereby rupturing or distending the starch-cells thereof, substantially as and for the purpose herein set forth.

2. As an improvement in the process of brewing, distilling, and vinegar-making, subjecting one portion of the grain for the wort to agitation in a confined space at a temperature of 600° Fahrenheit, or thereabout, for some two or three minutes and mixing the said portion with another portion which has been converted into malt, substantially as and for the purpose herein set forth.

JOHN FORDRED.

Witnesses:
H. K. WHITE,
A. S. BISHOP.
6 *Bream's Buildings, London, E. C.*